J. S. GALESKI.
SPECTACLE NOSE BRIDGE.
APPLICATION FILED JAN. 29, 1920.

1,352,887.

Patented Sept. 14, 1920.

Inventor

J. S. Galeski.

By Lacy & Lacy, Attorneys

UNITED STATES PATENT OFFICE.

JOSEPH S. GALESKI, OF RICHMOND, VIRGINIA.

SPECTACLE NOSE-BRIDGE.

1,352,887.

Specification of Letters Patent.    Patented Sept. 14, 1920.

Application filed January 29, 1920. Serial No. 354,800.

*To all whom it may concern:*

Be it known that I, JOSEPH S. GALESKI, citizen of the United States, residing at Richmond, in the county of Henrico and State of Virginia, have invented certain new and useful Improvements in Spectacle Nose-Bridges, of which the following is a specification.

This invention relates to a nose bridge for spectacles. An object of the invention is to provide a nose piece formed of a single length of wire bended to proper shape and providing intermediate its ends, a nose bridge and nose pads formed integral from the single piece of wire the ends of which are provided with lens clamps or lens eye wires. A further feature of the invention is the particular manner in which the bridge is formed so that it does not press on the nose of the wearer and yet gives the glasses substantial support on the sides of the bridge of the nose of the wearer by reason of the peculiar configuration of the nose pads.

Another feature of the invention is to so construct the nose piece that the lenses attached thereto can be moved or bent so as to be closer together, or to set the lenses closer to or farther from the eyes. In adjusting glasses to the nose of the wearer it is customary to bend the bridge piece so that the proper distance from the eye is obtained and so that the glasses assume a proper plane with respect to the focal plane of the eye and in order to do this the bridge piece must be so arranged that it may be bent in different directions without appreciably deforming its construction so that after such bending it will have a proper appearance and form a proper support for the spectacles.

Figure 1:
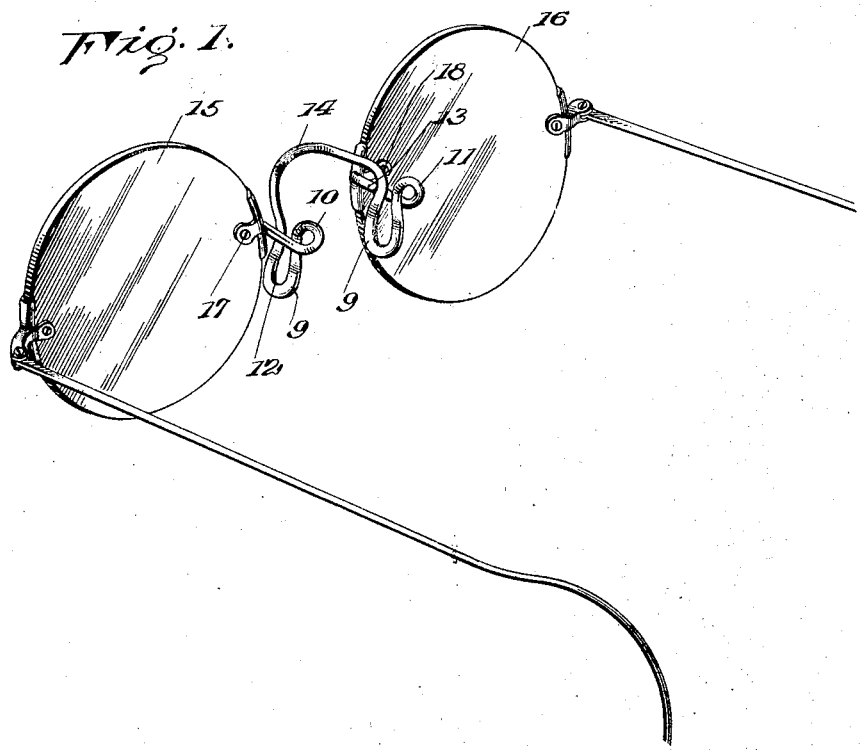
Figure 1 is a pair of spectacles having the nose piece applied thereto.
Figure 2:
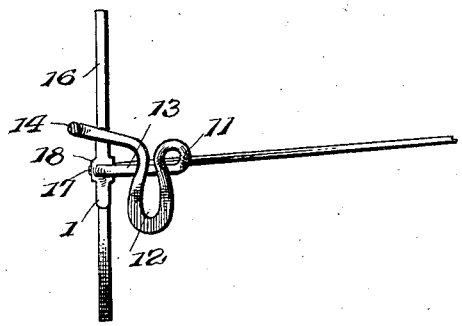
Fig. 2 is a central section vertically of the nose piece shown in Fig. 1.
Figure 3:
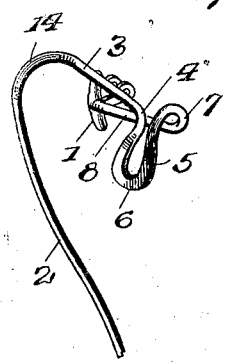
Fig. 3 is a view in perspective, of the nose piece in the process of formation.

The nose piece may be formed in several ways, one of which is to start with a loop as shown in Fig. 3 and, if desired, provide lens clamps 1 at each end thereof, only one being shown in Fig. 3. The legs or arms 2 and 3 of the loop are then bended to proper form as will be later set out. In forming the nose piece as shown in Fig. 3 and considering for instance the leg 3, the intermediate portion of said leg is bent downwardly as shown at 4 thence upwardly as indicated at 5 to provide a loop widened at the bottom thereof as at 6 and is then bent rearwardly as at 7 and forwardly as at 8 on the outside of the nose pad formed by the bends 4 and 5. The lens clamp 1, or an eye wire if rim spectacles are used, is then provided at right angles to the portion 8 for attachment of the lens in the proper plane. Similarly the other leg 2 of the loop may be formed into the pad and its attendant parts. After the pads are formed the looped portions are flattened and widened as indicated at 9 so as to provide a comfortable bearing surface for the wearer.

In constructing the bridge pieces above described it is evident that the loops 10 and 11 together with the portions 12 and 13 provide means whereby suitable bends may be imparted to the structure for adjusting the nose piece to the conditions necessary for making them comfortable and proper for different wearers. The lenses 15 and 16 are fastened in place by the usual screws 17 and 18 in their respective lens clamps, or by eye wires on a rimmed spectacle.

The nose piece may also be formed in the reverse operations from those previously described, that is to say the lens clamps may be formed on the ends of the wire and the wire bended to a loop after which the central portion of the loop is bended forwardly and downwardly to form the loops 10 and 11 and thence backwardly on itself to form the pads 9 and forwardly to provide the bridge piece.

It is obvious that various methods may be used in forming up the bridge piece but so long as the same configuration is imparted thereto it will always provide the necessary adjusting curves or lengths to suit the needs of different conditions.

While I have herein described this invention as applicable to spectacles it is, nevertheless, to be understood, that in carrying the invention into practice, I may also apply the same to the bridge piece of nose glasses wherein similar problems of adjustment occur as are encountered in the case of spectacles.

I claim:

1. A nose piece for spectacles comprising a bridge member having lens clamps at each end thereof, the intermediate portion of said bridge member being brought rearwardly of the lens clamps at right angles to the plane of the lens and looped upwardly, thence downwardly and again upwardly to form nose pads with a connecting bridge.

2. A nose piece for spectacles comprising a loop having ends bended downwardly, thence upwardly to form nose pads and each end finally bended rearwardly and forwardly on the outside of its respective nose pad at right angles to the plane of the lens and provided with lens clamps.

3. A nose piece for spectacles, comprising a loop having the ends bended downwardly, thence upwardly to form nose pads, the material of the loop being flat at this portion, and each end finally bended rearwardly and forwardly on the outside of its respective nose pad at right angles to the plane of the lens and provided with lens clamps.

In testimony whereof I affix my signature.

JOSEPH S. GALESKI. [L. S.]